United States Patent [19]
Foster et al.

[11] 3,732,077
[45] May 8, 1973

[54] METHOD AND COMPOSITION FOR DETERMINING BUN

[75] Inventors: Lowell B. Foster; Jane M. Hochholzer, both of Birmingham, Ala.

[73] Assignee: Damon Corporation, Needham Heights, Mass.

[22] Filed: Oct. 29, 1971

[21] Appl. No.: 193,973

[52] U.S. Cl. ...........................23/230 B, 252/408
[51] Int. Cl. .....................G01n 33/16, G01n 21/24
[58] Field of Search ...................23/230 B; 252/408

[56] References Cited

UNITED STATES PATENTS 3,511,611   5/1970   Rush .............................23/230 B
3,567,374   3/1971   Wybenga .......................23/230 B

*Primary Examiner*—Morris O. Wolk
*Assistant Examiner*—R. E. Serwin
*Attorney*—Paul J. Cook

[57] ABSTRACT

Blood serum is tested for the presence of urea nitrogen by reacting urea present in the serum with an aqueous reagent having a pH of between 0.4 and 1.5 and containing diacetylmonoxime, phenazone, arsenic pentoxide and sulfuric acid. Reaction is effected by heating the serum-reagent mixture to 85° to 100° C., cooling and measuring the optical absorbance of the cooled mixture at a wavelength between 450 and 485 nm.

3 Claims, No Drawings

METHOD AND COMPOSITION FOR DETERMINING BUN

BACKGROUND OF THE INVENTION

This invention relates to a composition and method for determining blood urea nitrogen concentration.

At the present time, reagents based on diacetylmonoxime have been employed to determine the concentration of blood urea nitrogen (BUN). Unfortunately, each of these methods has undesirable characteristics which has limited their use. Most methods based upon diacetylmonoxime require multiple reagents and therefore multiple, time consuming pipetting steps. A few methods utilize a single reagent, but in each case, the single reagent is chemically unstable and must be used to test for BUN quickly after preparation. Furthermore, most methods based upon diacetylmonoxime require deproteinization of the sample prior to BUN determination since protein is a known potential interferent. It would be highly desirable to provide a composition and method for determining BUN based upon diacetylmonoxime requiring only one reagent which is stable for long periods. Furthermore, it would be desirable to provide such a composition and method which produces a colored reaction product that obeys Beer's law and can be used directly on non-deproteinized blood serum.

SUMMARY OF THE INVENTION

The present invention is based upon the discovery that a stable diacetylmonoxime-based reagent suitable for producting a colored reaction product obeying Beer's law can be formed when the pH of the reagent and the concentration of its components are carefully controlled. The reagent comprises an aqueous solution having a pH between about 0.4 and 1.5, preferably between 0.5 and 0.7, and containing 0.03 to 0.10 moles diacetylmonoxime per liter water, 0.005 to 0.030 moles phenazone per liter water, 0.022 to 0.07 moles arsenic pentoxide per liter water and sulfuric acid. In use, the reagent and blood serum being tested are mixed, heated to a temperature between about 85° to 100° C. for about 10 to 20 minutes, cooled to room temperature and the color change noted within about 15 minutes after cooling. The color is compared with that of known standards and the BUN concentration determined in accordance with Beer's law. The optical density of the sample is determined at a wavelength between 450 and 485 nm.

DESCRIPTION OF SPECIFIC EMBODIMENTS

The reagent is prepared by dissolving arsenic pentoxide in a heated basic aqueous solution maintained at a pH above about 10. Thereafter, the solution is rendered acidic by adding sulfuric acid in two stages. In the first stage, sufficient sulfuric acid is added to render the solution substantially neutral. Thereafter, sufficient sulfuric acid is added to render the solution acidic to the pH of between 0.4 and 1.5. During the acid addition, the solution is maintained at a temperature of between about 22° and 56° C. After sulfuric acid addition, the solution is cooled at room temperature and phenazone in an amount between about 0.1 and about 0.6 mols per mol of arsenic pentoxide and diacetylmonoxime in amounts between about 0.7 and about 2.3 mols per mol of arsenic pentoxide are dissolved therein.

The composition of this invention is stable for long periods as evidenced by its stability for two months and longer when stored at about 4° C. in a brown glass bottle. While test sensitivity can be increased by increasing sulfuric acid concentration in the reagent, there is an accompanying decrease in reagent stability. Since the reagent described above produces excellent sensitivity, increased concentrations of sulfuric acid are undesirable. The reagent can be employed directly on serum which may or may not be deproteined. The colored reaction product produced thereby exhibits a linear curve in accordance with Beer's law. As indicated by extensive comparisons of patient sera with methods such as the urease method and the automated BUN method there is no sacrifice in accuracy or reproducibility with this composition even in the presence of protein. Accordingly, the present invention provides distinct advantages over the prior art methods based upon diacetylmonoxime reagents.

In accordance with the method of this invention, the above-described composition is added to a serum sample being tested and the concentration of the colored reaction product, if any, is measured against the concentration of a colored reaction product of a known standard containing urea. The standards and the serum samples being tested can be diluted with distilled water to the degree desired. The composition described above is added to the standard serum and heated to a temperature of between about 85° C. and about 100° C. for a period of time up to about 45 minutes. A convenient method for heating comprises placing the container containing the sample or the standard in a boiling water bath. After being heated, the sample is removed, cooled and the degree of color determined. The degree of color can be determined with any suitable apparatus well known in the art such as a Spectronic 70 (Bausch & Lomb, Rochester, New York). The concentrations of BUN are determined in accordance with the linear relationship of light absorbance as a function of BUN concentration. Quantities of samples and standards that can be employed can be widely varied. It is only necessary that the ratio of sample to diacetylmonoxime reagent remain at about 1:1,000. For example, 5 microliters of sample and 5 milliliters of reagent can be employed.

In some cases, the final solution becomes turbid due to lipemic serum. Should this occur, diethyl ether or other organic lipid solvent can be added to the reagent-serum solution and shaken vigorously. The resultant composition can be separated such as by centrifugation. The liquid phase then is treated to remove the ether layer such as by aspiration and the remaining colored aqueous sample is measured for light absorbance.

The following examples illustrate the present invention and are not intended to limit the same.

EXAMPLE I

This example illustrates the preferred method for forming the diacetylmonoxime reagent of this invention. Arsenic pentoxide, 10 g, and sodium hydroxide, 7 g, are dissolved in about 800 ml of distilled water in a 1 liter Erlenmeyer flask. The solution is heated to completely dissolve the arsenic pentoxide. Two drops of phenolphthalein indicator (1% w/v in methonol:water 60/40 v/v) are added to the solution and then concentrated sulfuric acid is added to the solution until the pink color of the indicator is just discharged. Thereafter an additional 28 ml of cocentrated sulfuric acid is added and the solution is cooled. Phenazone, 3.0 g, and diacetylmonoxime, 5.0 g, are added to the solution while stirring until the ingredients are completely dissolved. The solution then is diluted to 1 liter with distilled water and mixed. The reagent is stable for at least 2 months when stored at 4° C. in a brown bottle.

EXAMPLE II

This example illustrates the method for analyzing blood serum for urea nitrogen employing the reagent of this invention.

A standard BUN stock solution was prepared by dissolving 2.143 g of urea in distilled water. The stock standard was stable for at least 3 months when stored at 4° C. BUN working standards of 10.0, 20.0 and 50.0 mg/100 ml were prepared by pipetting respectively 1.0, 2.0 and 5.0 ml of the BUN stock standard each in a separate 100 ml volumetric flask. Each was then diluted to 100 ml with distilled water to form solutions stable for 1 month when stored at 4° C.

Due to the extreme sensitivity of this procedure, only a small amount of blood sample is necessary. Diluted samples, were prepared from the standards and the blood serum specimens being tested by diluting each of them with water at 1:10 and then 0.10 ml of the diluted standards and serum samples as well as a sample comprising 0.01 ml of water were each delivered to an appropriately labeled 19 mm cuvet. To each diluted sample was added 10 ml of diacetylmonoxime reagent prepared by the method of Example I and the resultant mixture was heated by being placed in boiling water bath for 15 minutes. Each sample then was removed, cooled and the absorbance thereof measured at 460 nm within 15 minutes after cooling while setting 100% T with the water blank. Calculations of BUN concentration in the unknowns were based upon their direct relationship to the absorbance of these standards, All absorbance measurements were made in 19 mm round cuvets in a Spectronic 70 (Bausch & Lomb, Rochester, New York).

When employing the above-described technique, it has been found that color development is complete within 12 to 15 minutes in the boiling water bath and that the color remains stable after cooling the room temperature for an additional 15 minutes. In addition, it has been found that the color loss of the cool sample is about only 2% T after about 45 minutes. Thus, the Beer's law relationship is obtained when the cooled sample is tested within about 15 minutes after being cooled to room temperature.

We claim:

1. A stable composition for determining the presence of urea blood serum comprising an aqueous solution having a pH between 0.4 and 1.5 and containing, per liter water, 0.03 to 0.10 mol diacetylmonoxime, 0.005 to 0.030 mol phenazone, 0.022 to 0.07 mol arsenic pentoxide and sulfuric acid.

2. The method of determining the presence of urea nitrogen in blood serum which comprises mixing a blood serum sample with the reagent of claim 1, heating the mixture between 85° and 100° C., cooling the mixture to room temperature and determining the optical density of the cooled mixture at a wavelength between 450 and 485 nm within about 15 minutes after the mixture is cooled.

3. The method of claim 2 wherein the pH of the reagent is between 0.4 and 1.5.

* * * * *